Jan. 12, 1971     A. W. GAUBATZ     3,554,622

ROLLER BEARINGS

Filed May 23, 1969

INVENTOR.
Arthur W. Gaubatz
BY
F. J. Fodale
ATTORNEY

United States Patent Office 3,554,622
Patented Jan. 12, 1971

3,554,622
ROLLER BEARINGS
Arthur William Gaubatz, 2805 NW. 48th St.,
Fort Lauderdale, Fla. 33313
Filed May 23, 1969, Ser. No. 827,265
Int. Cl. F16c 33/34
U.S. Cl. 308—214
8 Claims

ABSTRACT OF THE DISCLOSURE

A high speed heavy duty roller bearing construction is disclosed. This bearing in which the races may be separate pieces or provided by integral structure adjacent the rollers uses a cage comprising two end rings and a number of circumferentially spaced pins. The rollers are hollow and floating bushings are provided between the rollers and the pins to decrease the rubbing velocity between the rollers and the pins and thereby increase the bearing life.

---

The invention herein described was made in the course of work under a contract or subcontract thereunder with the United States Department of Defense (Air Force).

This invention relates generally to roller bearings and more specifically to an improved roller bearing of the type wherein the rollers are journaled on pins which are a part of the cage.

The advantage of using a hollow roller in those environments in which the radial growth between bearing races is significant has long been recognized. The hollow roller being relatively resilient can accommodate a high initial preload and thus adjust to a greater radial growth between the races. It is also recognized that when such an environment is also a high speed application, it is highly desirable to use spaced rollers as opposed to a full complement of rollers which rub against each other. Then too, the cage or means to space the rollers must also avoid excessive rubbing speeds between the rollers and the cage parts. Another consideration is that of excessive heat since high speeds produce frictional heat and since radial growth is most often the result of operation of the bearing in a high temperature environment.

Broadly, my invention is directed to providing an assembly of spaced rollers in which the rollers are hollow and thus incorporate the attendant advantage of accepting a high initial preload and yet one in which excessive rubbing between rollers and the structure used to separate them is not excessive at high speeds.

Another object of my invention is to provide such a bearing which is lightweight and thus especially suitable for but not limited to aircraft and similar applications where weight is an important factor.

Another object of my invention is to provide such a bearing adapted for the flow of a coolant through the hollow rollers thus increasing its speed and environmental temperature operation capabilities.

Another object of my invention is to provide such a bearing in which the rollers are accurately guided.

Other objects and features of the invention will become apparent to those skilled in the art as the disclosure is made in the following detailed description of a preferred embodiment of the invention as illustrated in the accompanying sheet of drawing in which.

Figure 1:
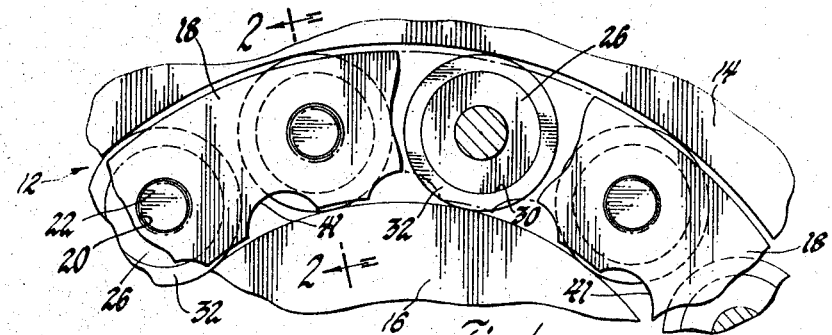
FIG. 1 is a partial end view of a cylindrical roller bearing in accordance with my invention with a portion of the cage end ring broken away for clarity.

Referring now to the drawings and more specifically to FIG. 1, the caged roller assembly indicated generally at 12 is disposed between outer and inner relatively rotatable races 14 and 16, respectively. These races may be separate pieces or as in the particular instance shown provided as an integral part of the environmental structure of the caged roller assembly 12.

Figure 2:
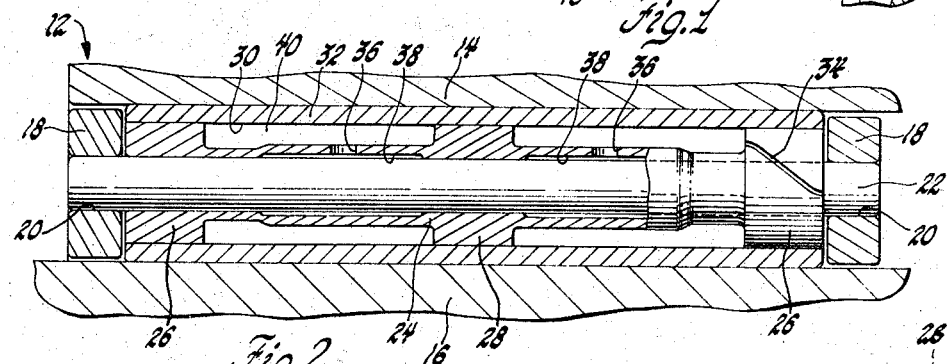
FIG. 2 is a section taken along the line 2—2 of FIG. 1 showing an axial section through a typical roller and its relationship to the cage parts and bushing.

From FIG. 2, it can be seen that the cage comprises two spaced end rings 18, each of which has a number of circumferentially spaced holes 20 into which are nonrotatably secured the ends of pins 22. The pins 22 are hardened and ground steel and may be nonrotatably secured to the end rings 18 by a simple pressfit with a selected number of pins preferably tackwelded to insure nonseparability of the assembly. Journaled on each of the pins 22 is a bushing 24 which is preferably a lightweight plain bearing alloy, for example, magnesium-tin or aluminum-tin. The bushing shown in FIG. 2 has enlarged end portions 26 and an enlarged midportion 28, all of which have their outer circumferential surface spaced closely adjacent the inner circumferential surface 30 of a hollow roller 32 which is journaled on these surfaces of the bushing 24. The spacing provided between the outer circumference of the enlarged portions 26 and 28 and the interior surface 30 of the hollow roller should be such that the hollow rollers are reasonably accurately guided by the bushing, however, the space should be sufficient to allow flexing of the hollow rollers 32 to allow them to accept an appreciable preload produced by an interference fit of the rollers between the outer and inner races 14 and 16, respectively. Generally speaking, this interference fit is on the order of a few thousandths of an inch. Thus the bushing 24 floats, that is, it slips relative to both the hollow roller 32 and the pin 22.

Figure 3:
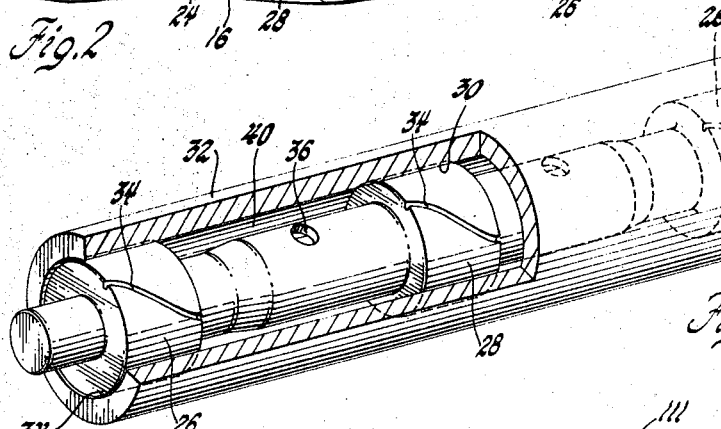
FIG. 3 is a perspective view of the roller shown in FIG. 2 with a portion of the hollow roller broken away to show the interior bushing.

From FIG. 3, it can be seen that the outer circumferential surfaces of the enlarged portions 26 and 28 have helical grooves 34 and that the reduced portions of the bushing have passages 36 by which chambers 38 between the interior of the bushing and the pin 22 communicate with chambers 40 defined by the reduced portion of the bushing and the interior of the hollow roller 32. In one of its normal applications, the subject bearing assembly 12 is used in a closed gear box at least partially filled with a lubricant which also serves as a cooling medium. In operation, when the races 14 and 16 rotate with respect to each other, the rollers 32, of course, rotate about their centers which in turn orbit in the pitch circle of the assembly 12. During rotation of the rollers 32, there is relative movement between the interior surface of the hollow roller 32 and the exterior surface on the enlarged portions 26 and 28 of the bushings 24. And since the bushings are also journaled on the pins 22, there is relative movement between the inner surface of the bushings and the pins. This is a first advantage of my invention, namely, through the intermediary of a bushing, the relative rotation between the hollow rollers and the pins is reduced since the relative movement occurs at two surfaces. The reduction in relative velocity reduces bearing wear, and therefore, increases bearing life.

Another advantage of my invention can be appreciated from the fact that the relative rotation of the bushing 24 with respect to the hollow roller 32 causes the helical grooves 34 to produce a pumping action on any lubricant in the vicinity of the rollers. This action pumps lubricant into the interior of the roller and into the interior chamber 38 via hole 36. This circulation of lubricant through the hollow roller carries heat from the interior of a hollow roller.

From FIG. 2, it is seen that the end rings 18 have a radial height only slightly less than the diameter of the hollow rollers 32. In such a case, it may be desirable to scallop one of the edges of the end rings to insure a plentiful supply of lubricant adjacent the hollow ends of the rollers for pumping into the roller interior. In FIG. 1, end ring 18 is illustrated as having spaced scallops 41 on its inner margin with one being located midway between each two adjacent rollers.

It is also to be appreciated that my invention includes the main advantage of a hollow roller, namely, the ability to accept a higher residual preload for increased bearing life and yet does not encounter prohibitive rubbing against any cage parts.

Figure 4:
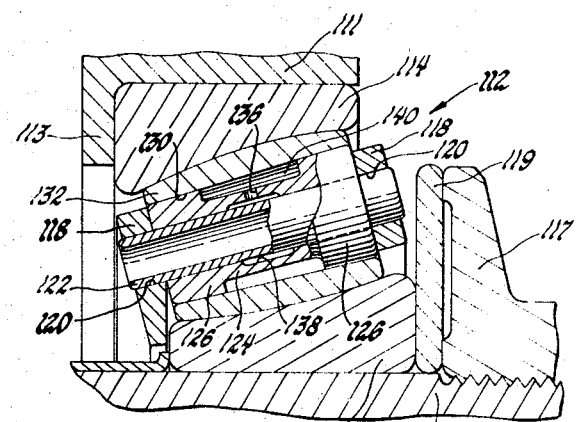
FIG. 4 is a section taken through the axis of a spherical roller bearing embodying the principles of my invention.
Figure 5:
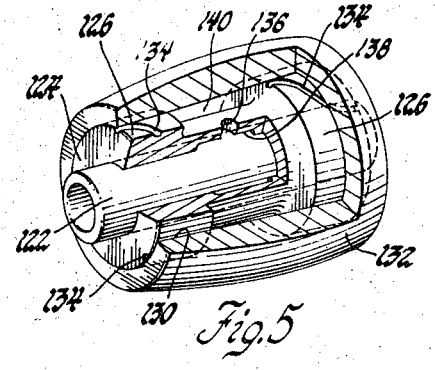
FIG. 5 is a perspective view of a typical roller shown in FIG. 4 with the hollow roller and interior bushing broken away for clarity.

Referring now to FIGS. 4 and 5, I have illustrated the principles of my invention applied to a spherical bearing. In this particular instance, the relatively rotatable outer and inner races 114 and 116, respectively, are separate discrete members. The outer race 114 is mounted in the bore of a supporting structure 111 against a thrust shoulder 113. The inner race 116 is mounted on a shaft 115 which includes a reaction member 117. A Belleville washer 119 disposed between the reaction member 117 and the right end face of the inner race 116 exerts an axial force which in turn preloads the hollow rollers 132.

Referring now more specifically to FIG. 4, the caged roller assembly indicated generally at 112 will be described.

The cage comprises two spaced end rings 118, each of which has a number of circumferentially spaced holes 120 into which are nonrotatably secured the ends of pins 122 which in this instance are hollow. The pins 122 are hardened and ground steel and may be nonrotatably secured to the end rings 118 by a simple pressfit with a selected number of pins preferably tackwelded to insure nonseparability of the assembly. Journaled on each of the pins 122 is a bushing 124 which is preferably a lightweight plain bearing alloy, for example, magnesium-tin or aluminum-tin. The bushing shown in FIG. 4 being somewhat shorter than that shown in FIG. 2 has enlarged end portions 126 only, both of which have their outer circumferential surface spaced closely adjacent the inner cylindrical surface 130 of the hollow roller 132 journaled on these surfaces. The spacing provided between the outer circumference of the enlarged portions 126 and the interior surface 130 of the hollow roller is such that the hollow rollers are reasonably accurately guided by the bushing while at the same time allowing sufficient flexing of the hollow rollers 132 to accept the preload imposed by the Belleville spring 119.

From FIG. 5 it can be seen that the outer circumferential surfaces of the enlarged portions 126 have helical grooves 134 with the reduced portion of the bushing between the portions 126 being provided with a passage 136. The passage 136 fluidly connects chamber 138 between the interior of the bushing and the pin 122 with a chamber 140 defined by the reduced portion of the bushing and the interior of the hollow roller 132.

Similarly, the helical grooves 134 produce a pumping action on any lubricant in the vicinity of the rollers to circulate it into the interior of the roller and into the interior chamber 138 via hole 136.

This second embodiment realizes the same advantages referred to above in connection with the first embodiment. Another advantage incorporated into this embodiment is best understood in reference to FIG. 4 wherein the left end ring 118 is illustrated as being extended radially inwardly into an overlapping relationship with the left end face of the inner race 116. One of the characteristics of a spherical roller is that it tends to skew. This tendency to skew is counteracted by the overlap or contact of the left end ring 118 with the left end face of the inner race 116. It may be desirable in some instances to plate one or both of the contacting surfaces with a low friction material, such as silver.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:
1. The combination comprising:
   a cage having a pair of spaced end rings,
   a plurality of circumferentially spaced pins having their end portions nonrotatably mounted on said end rings, respectively,
   a bushing journaled on each of said pins between said end rings, and
   a hollow roller journaled on each of said bushings whereby a unit-handled assembly of circumferentially spaced hollow rollers is provided in which a floating bushing is provided between the hollow rollers and the pins to reduce rubbing velocities and thereby the wear on the pins and rollers.

2. The combination as defined in claim 1 wherein said pins and hollow rollers are steel and wherein said bushings are of a lighter weight material.

3. The combination as defined in claim 1 further including inner and outer relatively rotatable race means and in which the hollow rollers are disposed between said race means with an interference fit.

4. The combination as defined in claim 3 wherein said hollow rollers have partispherical surfaces wherein one of said race means has a radial face and wherein one of said end rings extends radially and overlaps said radial face whereby said cage is guided by said radial face to prevent skewing of said rollers.

5. The combination as defined in claim 1 wherein said bushings have enlarged end portions closely spaced to the inner circumferential surface of said hollow rollers and wherein said end portions include helical grooves whereby said bearing is adapted to pump a cooling medium into the interior of said hollow rollers when said bearing is rotating in a cooling medium environment.

6. The combination as defined in claim 5 wherein a chamber is provided between each of said bushings and said pins and wherein passage means through each of said bushings is provided in said bushings between said enlarged end portions whereby heat is carried from said pins when said bearing is operating in a cooling medium environment.

7. The combination as defined in claim 5 wherein said bushing further includes an enlarged portion between said enlarged end portions, said enlarged midportion being closely spaced to the inner circumferential surface of said hollow rollers and provided with helical grooves to aid the flow of cooling medium through said hollow rollers.

8. The combination as defined in claim 7 wherein a chamber is provided between each of said bushings and said pins and wherein passage means through each of said bushings is provided in said bushings between said enlarged end portions whereby heat is carried from said pins when said bearing is operating in a cooling medium environment.

References Cited
UNITED STATES PATENTS 855,169  5/1907  Geschke _____ 308—213

FRED C. MATTERN, JR., Primary Examiner